United States Patent
Butts

(10) Patent No.: US 6,708,359 B2
(45) Date of Patent: Mar. 23, 2004

(54) MULTI-PURPOSE FISHERMEN'S PLIERS

(75) Inventor: Brian B. Butts, Rome, NY (US)

(73) Assignee: Sampo, Inc., Barneveld, NY (US)

( * ) Notice: Subject to any disclaimer, the term of this patent is extended or adjusted under 35 U.S.C. 154(b) by 0 days.

(21) Appl. No.: 10/178,161

(22) Filed: Jun. 24, 2002

(65) Prior Publication Data

US 2003/0233708 A1 Dec. 25, 2003

(51) Int. Cl.[7] .................................................. B25F 1/00
(52) U.S. Cl. ....................... 7/106; 7/107; 7/129; 7/158; 81/423
(58) Field of Search .............................. 7/106–107, 125, 7/127, 129–135, 158; 81/418, 421–423

(56) References Cited

U.S. PATENT DOCUMENTS

| 651,082 | A | * | 6/1900 | McClary | 7/133 |
| 4,083,105 | A | * | 4/1978 | ViPond | 7/107 |
| 4,796,318 | A | * | 1/1989 | Bigej | 7/106 |
| 5,113,727 | A | * | 5/1992 | Foster | 81/423 |
| 5,323,502 | A | * | 6/1994 | Miller | 7/107 |

* cited by examiner

Primary Examiner—D. S. Meislin
(74) Attorney, Agent, or Firm—Wall Marjama & Bilinski LLP

(57) ABSTRACT

A pair of fishermen's pliers having two lever arms pivotably joined by a pivot and wherein the arms further include nose sections that extend outwardly from the pivot. A pair of gripping jaws are located at the distal end of the nose sections and first and second cutting tool are mounted in the nose sections in series behind the gripping jaws. One cutter is designed to cut a first range of materials while the second cutter is designed to cut a second range of materials.

9 Claims, 3 Drawing Sheets

MULTI-PURPOSE FISHERMEN'S PLIERS

FIELD OF THE INVENTION

This invention relates to a pair of fishermen's pliers and, in particular, to a pair of multi-purpose fishermen's pliers.

BACKGROUND OF THE INVENTION

Most serious fishermen have the need for a number of different tools for cutting line, crimping hooks and lures and various other tasks relating to maintaining, adjusting, and repairing fishing gear and tackle. Presently there is a wide range of lines that are presently available that are fabricated from many different and diverse materials. Accordingly, the cutters needed to cut a certain material may be entirely unsuitable for cutting a different material. In addition to different cutting tools, most anglers also require a good set of pliers for grasping, crimping and holding hooks, lures and the like as the fishing tackle, is being assembled or adjusted. Attempting to utilize a number of different tools in the confines of a boat or at the end of a pier can at times, prove to be difficult.

In a U.S. Pat. No. 4,208,749 to Hermann there is disclosed a pair of fishermen's pliers that combine a pair of gripping jaws with a set of straight edge cutting blades that are arranged to come together along a common cutting line as the gripping jaws are closed. The cutting blades are located between the gripping jaws and the pivot point of the pliers lever arms. In another embodiment of the invention, a second set of straight edge cutting blades are mounted in the lever arms behind the pivot point. Although the straight edge blades employed by Hermann works well when cutting certain materials, the blade edges tend to break down and become nicked when the blades are used to cut hard materials such as metal lines.

Koelewyn, in U.S. Pat. No. 5,862,552 also discloses a pair of pliers suitable for use by a fishermen. Here again, the gripping jaws of the pliers are combined with a set of straight edge cutting blades that are adapted to close along a common cutting line as the gripping jaws are closed. The cutting blades in this case are angularly offset with regard to the gripping jaws.

SUMMARY OF THE INVENTION

It is therefore an object of the present invention to improve pliers of the type utilized by fishermen.

It is a further object of the present invention to provide a pair of fishermen's pliers that can perform a wide range of functions relating to the adjusting and maintaining of fishing gear and tackle.

A still further object of the present invention to provide a pair of fishermen's pliers having two sets of cutters that are capable of cutting a wide range of materials.

Another object of the present invention is to provide a pair of fishermen's pliers having one set of cutters for delivering a first cutting action and a second set of cutters for delivering a second cutting action such that a wide range of different materials can be cut by the pliers.

These and other objects of the present invention are attained by a pair of fishermen's pliers having a pair of lever arms that are rotatably joined by a pivot so that the arms can move between an open position and a closed position. Each arm further includes an extended nose section that protrudes outwardly from the pivot. The nose sections contain a set of gripper jaws at the distal end thereof, a first set of cutting jaws situated behind the gripping jaws and a second set of cutting jaws situated behind the first set of cutting jaws. The first set of cutting jaws include a straight edge blade that is arranged to close against the flat face of an anvil with a slicing action as the lever arms are brought to a closed position. The second set of cutting jaws contain a pair of coacting blades that are arranged to provide a scissor action as the lever arms are brought to a closed position.

BRIEF DESCRIPTION OF THE DRAWINGS

For a further understanding of these and objects of the invention, reference will be made to the following detailed description of the invention which is to be read in association with the accompanying drawing, wherein.

DETAILED DESCRIPTION OF THE INVENTION

Figure 1:
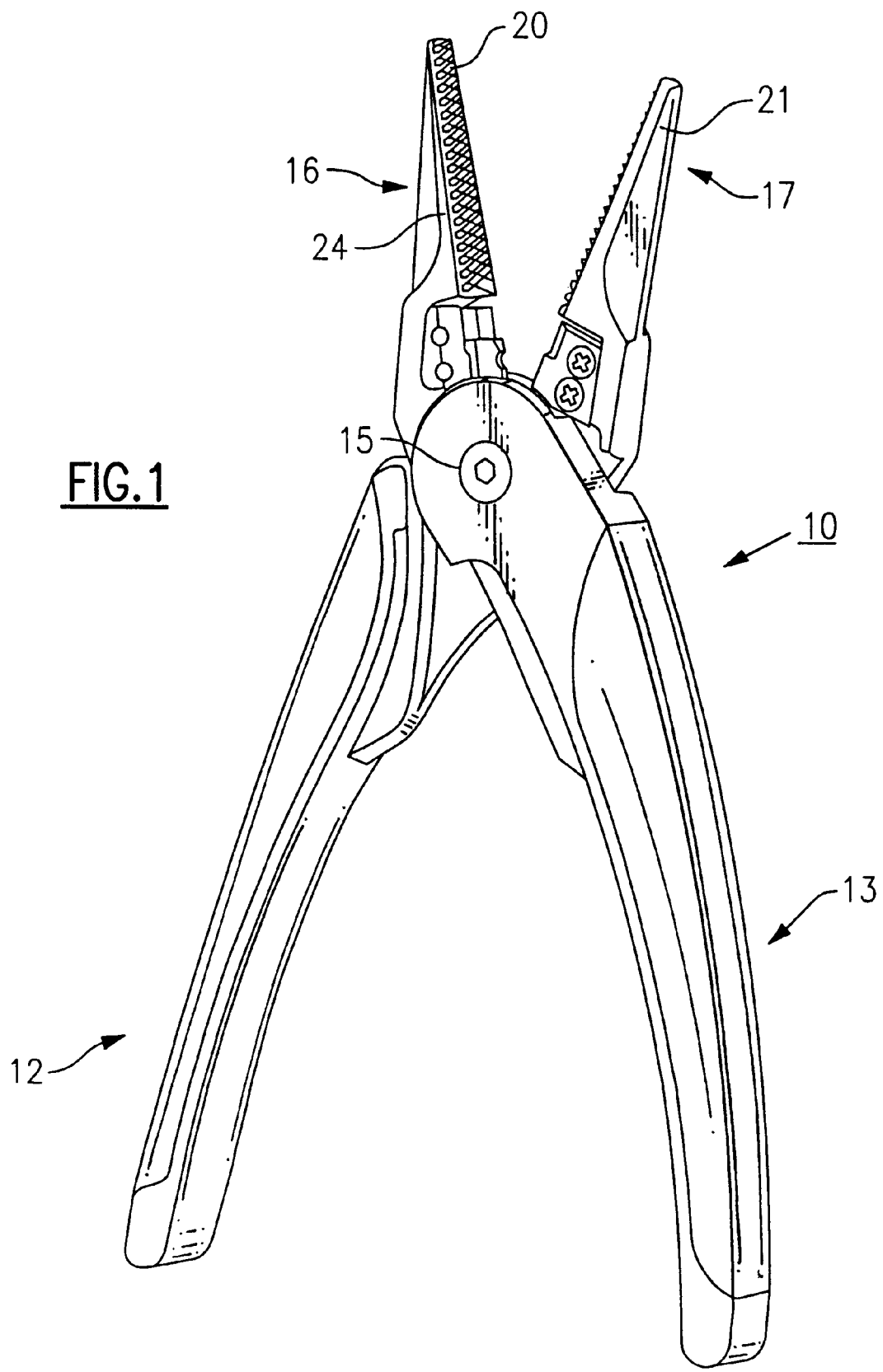
FIG. 1 is a perspective view of a pair of fishermen's pliers embodying the teachings of the present invention illustrating the lever arms of the pliers in a fully open position.

Turning now to the drawings, FIG. 1 illustrates a pair of pliers, generally referenced 10, of the type typically employed by sportsmen, particularly fishermen, to adjust, maintain and repair their gear. Although the pliers are ideally suited for use by fishermen, they are equally adapted for use by campers and the like for carrying out various tasks involving crimping or grasping of various components and the clean cutting of a wide range of materials such as fiber and metal lines.

Figure 4:
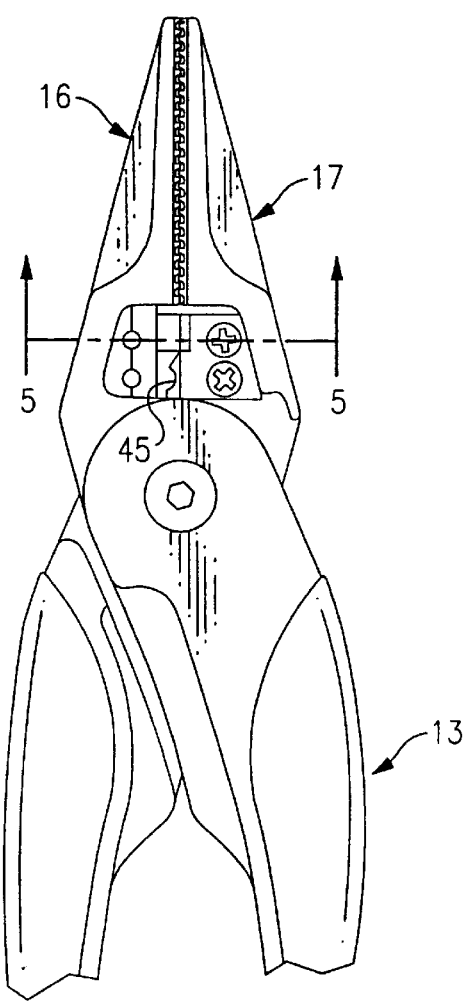
FIG. 4 is a partial front elevation of the pliers showing the pliers in a closed position.

The pliers include a pair of lever arms 12 and 13 that are rotatably connected at their distal ends by a trunnion like pivot 15. Each arm includes an extended nose section 16, 17 that protrudes from the distal end of each arm outwardly from the pivot. A pair of gripping jaws 20 and 21 are located at the outer end of each nose section. The opposed faces of the gripping jaws are provided with raised ridges 24 that furnish a high gripping force when the two nose sections are brought together as the arms are rotated about the pivot between a full open position as shown in FIGS. 1 and 2 and a closed position as shown in FIG. 4.

Figure 2:
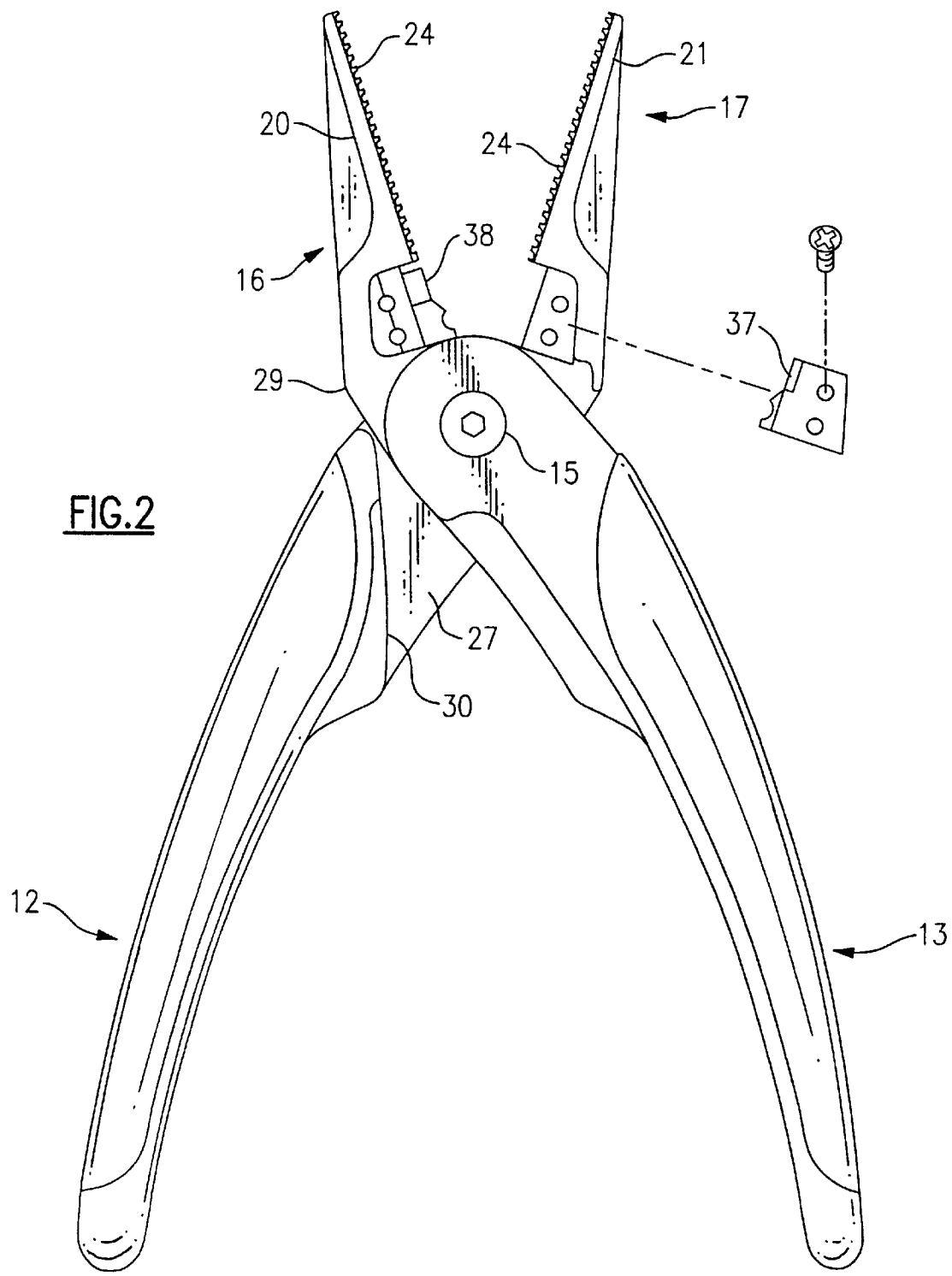
FIG. 2 is a front elevation of the plier shown in FIG. 1 showing one of a pair of cutting dies removed from the pliers.
Figure 3:
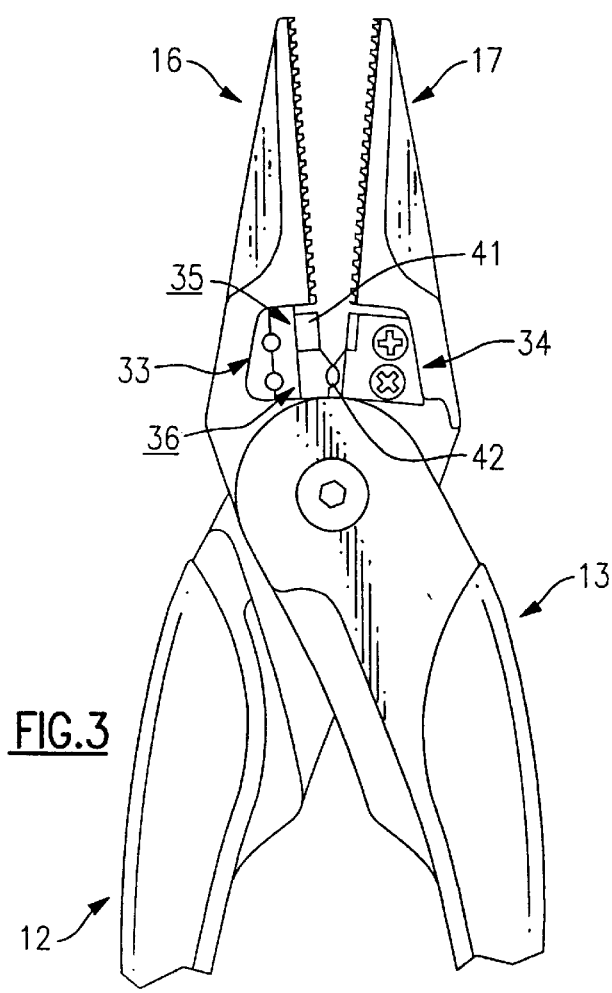
FIG. 3 is a partial front elevation of the pliers showing the pliers in a partially open position.

As best illustrated in FIG. 2, lever arm 12 contains a recess 27 in which a companion recess in the other lever arm is received. A spring (not shown) is contained within the pivot mechanism that functions to bias the arms into the open position. When in the open position, the inner edge 29 of arm 13 rests in arresting contact against the shoulder 30 of the recess 27. Rotating the lever arms about the pivot against the biasing action of the spring brings the gripping jaws contained in the nose section close together in almost touching contact as shown in FIG. 4. The pliers thus can operate in a conventional manner to grasp and securely hold various fishing related articles such as hooks, lines and the A pair of die blocks 33 and 34 are mounted directly behind the gripping jaws in the nose sections 16 and 17, respectively. As will be explained below in greater detail, the blocks are contoured from a tungsten carbide material to provide a first front cutting tool 35 and a second rear cutting tool 36 (FIG. 3). The front cutting tool includes a straight edge cutter 37 carried in die block 33 and a flat faced anvil 38 carried in the opposing die 34. As illustrated in FIG. 4, the straight edge blade is arranged to close against the flat face of the anvil as the lever arms of the pliers move between the open position and the closed position. The straight edge blade thus produces a slicing action against a work price that is seated upon the face of the anvil to provide a clean cut in the work piece. It has been found that the first or front cutting tool is ideally suited for cutting such items as fishing lines made of braided materials as well as other monofilament and multifilament lines made of natural or synthetic fibers.

In operation the straight edge blade is arranged to fuilly close against the anvil at the time the gripping jaws are brought into parallel alignment. Preferably, a slight clearance is maintained between the gripping jaws at the time the straight edge cutting blade is fully seated upon the anvil this insuring that the front tool will complete its straight line slicing action at closure.

The second or rear cutting tool contains a pair of scissor blades 41 and 42 located in the opposed die blocks. The cutting edges of the scissor blades are arranged to move one past the other in a close sliding relationship as the lever arms move between the noted open and closed positions to produce a scissoring action against a work piece that is placed between the blades. Each cutting edge of the scissor blades is provided with a semi-circular notch 45 which serves to locate the work piece within the tool. Here again, it has been found that this second cutting tool is ideally suited for use in cutting metal wire like materials such as hook, sinkers and the like.

With further reference to FIG. 3, it is important to note that the scissor blades are arrange to complete there scissor cutting action well before the straight edge cutting blade of the front tool closes against the anvil thus ensuring that a metal work piece mounted between the scissor blades is completely severed before the lever arms reach the closed position. By fabricating the two cutting tools using two die blocks of material, the timing of closure between the two tools can be accurately maintained without constant readjusting.

Figure 5:
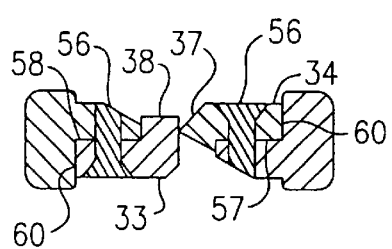
FIG. 5 is a sectional view taken along lines 5—5 in FIG. 4.

Each of the die blocks is secured to the nose section of a lever arm by two countersunk flat head screws 56–56. As illustrated in FIG. 5, the blocks are seated upon coplanar shelves 57 and 58 formed in the lever arm with the shelves being perpendicularly aligned with the axis of the pivot. Each tool block is provided with a locating shoulder 60 that is designed to register against the front face of a supporting shelf. When properly registered, the screw holes are aligned with threaded holes formed in the shelves. Accordingly, the tool blocks can be easily and accurately assembled or replaced in the lever arms using a simple screw driver.

While the present invention has been particularly shown and described with reference to the preferred mode as illustrated in the drawing, it will be understood by one skilled in the art that various changes in detail may be effected therein without departing from the spirit and scope of the invention as defined by the claims.

What is claimed is:

1. A pair of fishermen's pliers that include:
    a pair of lever arms, each arm having a distal end and an elongated nose section extending outwardly from the distal end of the arm,
    a pivot means for rotatably connecting the distal ends of the lever arms so that extended sections of the arms move toward and away from each other as the arms turn about the pivot means between an open and a closed position,
    a pair of coacting gripping jaws, each gripping jaw being mounted in an extended end of a nose section such that the gripper jaws are brought together when the lever arms are moved from the open position to the closed position,
    a first cutting tool located behind said gripping jaws, said first cutting tool including a flat faced anvil and a straight edge cutting blade that is arranged to close against said anvil face when the gripper jaws are brought to said closed position, and
    a second cutting tool located behind said first cutting tool that further includes a pair of coacting, scissor blades, the cutting edges of the scissor blades being arranged to pass in sliding contact to provide a scissor action as the lever arms move between said open and said closed positions,
    said scissor blades being arranged such that the cutting action of the scissor blades is completed before the flat edged blade of the first cutting tool closes against said anvil face.

2. The pliers of claim 1 wherein each scissor blade contains a notch formed in the cutting edge for locating a work piece between the scissor blades.

3. The pliers of claim 2 wherein said first and second cutting tool are integrally fabricated from two opposed die blocks each of which is mounted in one of said nose sections.

4. The pliers of claim 3 wherein the die blocks and are fabricated of a tungsten carbide material.

5. A pair of fishermen's pliers that include:
    a pair of pivotably joined lever arms, each arm having an elongated nose section that is arranged to rotate about a common pivot between a first open position and a second closed position,
    said nose sections further including a pair of opposed gripper jaws situated at the distal end of the nose sections, a first cutting tool mounted in said nose sections behind said gripping jaws, and a second cutting tool mounted in said nose sections behind the first tool, each of said cutting tools being fabricated from a pair of die blocks attached to said nose section; and
    wherein said first cutting tool contains a straight edge cutting blade mounted in one nose section that is arranged to close against a flat face anvil when the lever arms are brought to a closed position.

6. The pliers of claim 5 wherein said first cutting tool and the gripping jaws close at about the same time.

7. The pliers of claim 6 wherein said second cutting tool includes a pair of coacting scissor blades.

8. The pliers of claim 7 wherein said scissor blades are arranged to complete their cutting action prior to the straight edge blade closing against the anvil.

9. The pliers of claim 5, wherein the first and second cutting tools are integrally fabricated from said pair of die blocks each of said die blocks being releasably attachable to said nose section.

* * * * *